US011945080B2

(12) United States Patent
Cain

(10) Patent No.: US 11,945,080 B2
(45) Date of Patent: Apr. 2, 2024

(54) POWER TOOL WITH ADAPTIVE SPEED DURING TIGHTENING CYCLE

(71) Applicant: APEX BRANDS, INC., Apex, NC (US)

(72) Inventor: William Carlos Cain, Irmo, SC (US)

(73) Assignee: APEX BRANDS, INC., Apex, NC (US)

( * ) Notice: Subject to any disclaimer, the term of this patent is extended or adjusted under 35 U.S.C. 154(b) by 233 days.

(21) Appl. No.: 17/431,864

(22) PCT Filed: Feb. 19, 2020

(86) PCT No.: PCT/US2020/018732
§ 371 (c)(1),
(2) Date: Aug. 18, 2021

(87) PCT Pub. No.: WO2020/172211
PCT Pub. Date: Aug. 27, 2020

(65) Prior Publication Data

US 2022/0111501 A1 Apr. 14, 2022

Related U.S. Application Data

(60) Provisional application No. 62/807,439, filed on Feb. 19, 2019.

(51) Int. Cl.
*B25B 23/14* (2006.01)
*B25B 21/00* (2006.01)
*B25B 23/147* (2006.01)

(52) U.S. Cl.
CPC ............ *B25B 23/147* (2013.01); *B25B 21/00* (2013.01)

(58) Field of Classification Search
CPC ... B25B 23/14; B25B 23/1475; B25B 21/008; B25B 21/00; B25B 23/147
See application file for complete search history.

(56) References Cited

U.S. PATENT DOCUMENTS 5,105,130 A * 4/1992 Barker .................... B25F 5/00 318/268
5,410,229 A 4/1995 Sebastian et al.
(Continued)

FOREIGN PATENT DOCUMENTS

EP 3045268 A1 7/2016
WO 1998047665 A1 10/1998
WO 2011085194 A1 7/2011

OTHER PUBLICATIONS

International Search Report and Written Opinion from related international application PCT/US2020/018732, dated May 7, 2020, all pages cited in its entirety.
(Continued)

*Primary Examiner* — Thai T Dinh
(74) *Attorney, Agent, or Firm* — BURR & FORMAN LLP

(57) ABSTRACT

A power tool may include an end effector configured to enable a fastener to be applied by the power tool via a fastening cycle, a power unit, a drive assembly configured to apply drive power to the end effector responsive to application of input power thereto, and a motor configured to supply the input power to the drive assembly selectively based on operation of a power control assembly that controls coupling of the motor to the power unit. The drive assembly includes a clutch configured to interrupt application of the drive power at a target torque. The power control assembly may be configured to adaptively change speed of the motor in response to the power tool reaching a predefined torque value that is less than the target torque during the fastening cycle.

16 Claims, 4 Drawing Sheets

(56) References Cited

U.S. PATENT DOCUMENTS

| | | | | |
|---|---|---|---|---|
| 6,296,427 | B1 * | 10/2001 | Potter | B25F 5/001 408/124 |
| 6,836,614 | B2 * | 12/2004 | Gilmore | B25F 5/001 173/4 |
| 9,281,770 | B2 * | 3/2016 | Wood | H02P 6/08 |
| 9,352,456 | B2 * | 5/2016 | Murthy | B25B 23/14 |
| 10,357,871 | B2 * | 7/2019 | Thorson | B25B 23/141 |
| 11,260,509 | B2 * | 3/2022 | Hsu | B25B 21/00 |
| 2002/0153856 | A1 | 10/2002 | Gilmore | |
| 2014/0102741 | A1 * | 4/2014 | Sekino | B25B 21/02 173/181 |
| 2015/0025538 | A1 | 1/2015 | Kust et al. | |
| 2016/0318165 | A1 * | 11/2016 | Thorson | B25B 23/141 |

OTHER PUBLICATIONS

Extended European Search Report from related European Application No. 20759860.8, dated Sep. 21, 2022, all pages cited in its entirety.

* cited by examiner

Key
X angle
Y torque level, expressed as a percentage of test torque level
1 high torque-rate joint H
2 run-down Key
X angle
Y torque level, expressed as a percentage of test torque level
1 low torque-rate joint L
2 run-down

POWER TOOL WITH ADAPTIVE SPEED DURING TIGHTENING CYCLE

CROSS REFERENCE TO RELATED APPLICATIONS

This application claims priority to U.S. Application No. 62/807,439 filed on Feb. 19, 2019, the entire contents of which are hereby incorporated by reference in its entirety.

TECHNICAL FIELD

Example embodiments generally relate to power tools for tightening fasteners and, in particular, relate to a power tool that monitors current during a tightening cycle and adjusts speed to increase accuracy of shut off at a predefined torque.

BACKGROUND

Power tools are commonly used across all aspects of industry and in the homes of consumers. Power tools are employed for multiple applications including, for example, drilling, tightening, sanding, and/or the like. Handheld power tools are often preferred, or even required, for jobs that require a high degree of freedom of movement or access to certain difficult to reach objects.

In some specific industries, such as, but not limited to the aerospace industry and the automotive industry, the operation and use of power tools for tightening fasteners may be a key part of an assembly process. Moreover, tightening of the fasteners may be required to be accomplished to specific levels of torque. For many such tools, a mechanical clutch may be applied to break or interrupt the drive train when a desired torque (i.e., the level of torque specified for a given operation) is reached. Thus, for example, the tool would operate at full speed until the desired torque is reached, at which point the clutch breaks or interrupts the drive train to stop further application of torque, presumably at a level close to the desired torque.

However, it is known that for higher loads on the motor of the tool, the current required to drive the motor also increases. Meanwhile, torque accuracy is related to the motor speed due to dynamic effects inherent in mechanical systems. Thus, the operation of fastening tools at high speeds that would normally be desirable to increase the efficiency of assembly, may actually cause some sacrifices in terms of torque accuracy.

Accordingly, it may be desirable to continue to develop improved mechanisms by which to implement controls for hand tools so that the accuracy of the tool can be enhanced without suffering significant penalties in the effectiveness of the tool.

BRIEF SUMMARY OF SOME EXAMPLES

In an example embodiment, a power tool is provided. The power tool may include an end effector configured to enable a fastener to be applied by the power tool via a fastening cycle, a power unit, a drive assembly configured to apply drive power to the end effector responsive to application of input power thereto, and a motor configured to supply the input power to the drive assembly selectively based on operation of a power control assembly that controls coupling of the motor to the power unit. The drive assembly includes a clutch configured to interrupt application of the drive power at a target torque. The power control assembly may be configured to adaptively change speed of the motor in response to the power tool reaching a predefined torque value that is less than the target torque during the fastening cycle.

In another example embodiment, a power control assembly for a power tool is provided. The power control assembly may include an actuation assembly, and a tool actuator configured to provide a speed control input to a motor adapted to provide drive power to an end effector of the power tool when the tool actuator is actuated. The end effector may be configured to enable a fastener to be applied by the power tool via a fastening cycle. The actuation assembly may be configured to adaptively change speed of the motor in response to the power tool reaching a predefined torque value that is less than a target torque during the fastening cycle.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
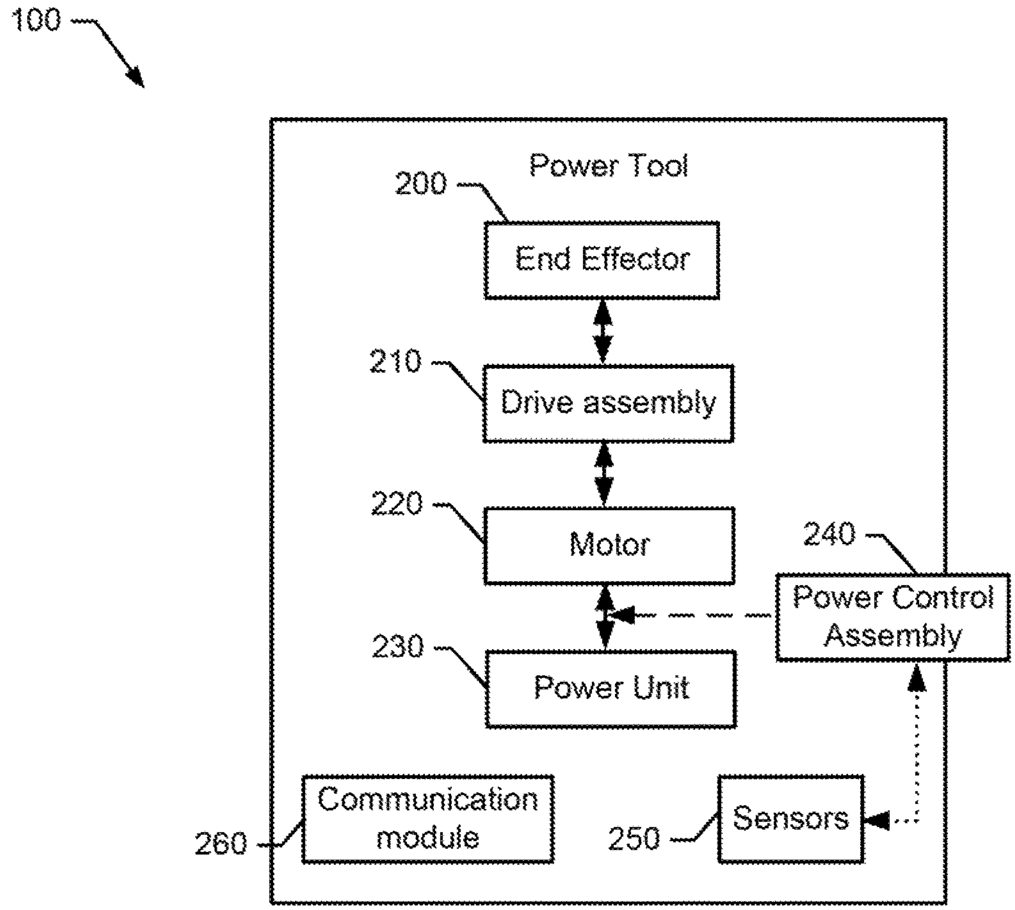
FIG. 1 illustrates a block diagram of components that may be employed in a power tool of in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a power tool that incorporates an improved torque accuracy. In this regard, some example embodiments may improve torque accuracy by slowing motor speed based on measured torque during a turning cycle. Such a tool may be part of a system for operation of power tools, or may operate in a stand-alone capacity independent of other system components.

FIG. 1 illustrates a block diagram of components that may be employed in a power tool 100 in accordance with an example embodiment. As shown in FIG. 1, the power tool 100 may include an end effector 200, a drive assembly 210 configured to drive the end effector 200, a motor 220 and a power unit 230. The power unit 230 may provide power for operation of the motor 220. When the motor 220 operates, the motor 220 may turn the drive assembly 210, which may in turn rotate the end effector 200 to perform a tightening operation. Control over the application of power to the motor 220, and therefore also control over the operation of the motor 220 and the power tool 130, may be provided via a power control assembly 240 (e.g., a trigger).

In some cases, the power tool 100 may further includes one or more sensors 250 and a communication module 260. However, such components need not be included in all embodiments. The motor 220 could be any type of motor. However, in an example embodiment, the motor 220 may be an AC or DC electric motor that is powered by an electric power source such as a battery or mains power. Thus, in an example embodiment, the power unit 230 from which the motor 220 is powered may be a removable and/or rechargeable battery pack housed within or attached to the housing of the power tool 100. However, the power unit 230 could be a source of pressurized air or other power source in various other example embodiments.

The communications module 260 (if employed) may include processing circuitry and corresponding communications equipment to enable the power tool 100 to communicate with an access point or other tools or devices using wireless communication techniques. However, in some cases, the communications module 260 may also include processing circuitry and corresponding communications equipment to support communication with the end effector 200. Although not shown, the power tool 100 may also include an LCD display for process parameter display, or for the display of other information associated with usage of the power tool 100. Alternatively or additionally, the power tool 100 may include lights or other indication components that can be operably coupled to the power control assembly 240, the power unit 230, the sensors 250, the motor 220, and/or the like in order to provide the operator with status information regarding such components.

In some cases, the end effector 200 or the power tool 100 may include one or more sensors 250, which may include strain gauges, thermocouples, Hall effect sensors, voltmeters, current sensors, transducers, infrared sensors, RFID sensors, cameras, and/or the like for sensing physical characteristics about the end effector 200, the power tool 100 and components thereof, including information regarding operation or the local environment. These sensed characteristics may include, for example, torque applied by the power tool 100 or to a workpiece, current draw by the motor 220 for turning the end effector 200, or other useful information.

As shown in FIG. 1, the motor 220 may also be operably coupled to the power unit 230 so that the motor 220 can be selectively operated based on actuation of the power control assembly 240. Thus, the power control assembly 240 may be operably coupled to either or both of the power unit 230 and the motor 220, or inserted therebetween in an operational capacity in order to control the operation of the motor 220 based on a position or condition of the power control assembly 240. The motor 220 may then, in turn, operate the drive assembly 210. The drive assembly 210 may then act to drive the end effector 200 to perform the function for which the end effector 200 is configured.

In various example embodiments, the end effector 200 may be a fastening tool, a material removal tool, an assembly tool, or the like. Thus, for example, the end effector 200 may be a spindle with attachments, a nutrunner, nutsetter, torque wrench, socket driver, drill, grinder, and/or the like. The drive assembly 210 may include gearing and/or other drive components that convert the rotational forces transmitted by the motor 220 to perform the corresponding function of the end effector 200 for fastening, material removal and/or assembly. In one embodiment, the power tool 100 is configured to be handheld by the user and may include a handle and a trigger associated with the power control assembly 240 may be provided for controlling operation of the power tool 100. In an example embodiment, the power tool 100 may be a right angle tool. In such an embodiment, the drive assembly 210 may include a bevel gear set configured to convert rotary motion of the motor 220 through a 90 degree angle via the bevel gear set. The drive assembly 210 may also include a mechanical clutch configured to interrupt the transfer of torque from the motor 220 to the end effector 200 when a predetermined torque is reached.

In an example embodiment, the power control assembly 240 may be provided at a portion of the power tool 100 (e.g., the handle) that can allow the operator to ergonomically handle and actuate the power tool 100. Thus, for example, the power control assembly 240 may include a trigger that is physically structured to be actuated easily by the hand of the operator while holding the handle. The power control assembly 240 may either provide a purely binary operating characteristic that is either fully on or fully off dependent upon the position of the trigger, or the amount of depression of the trigger may dictate the amount of current provided to the motor 220 and therefore also determine speed to at least some degree. However, in some examples, it should be appreciated that fully depressing an operator (e.g., trigger) of the power control assembly generally tends to cause the motor 220 to turn the end effector 200 at an operational speed at 100% of the capability of the power tool 100.

Figure 2:
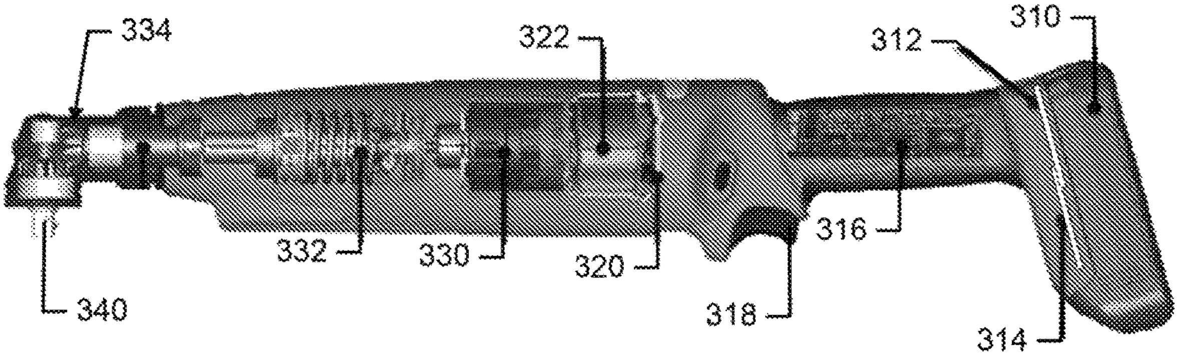
FIG. 2 illustrates a partial cutaway view of a power tool, where portions of the housing of the power tool have been removed to show the relative locations of various internal components in accordance with an example embodiment.

As discussed above, operation at high speeds can negatively impact power tool torque accuracy. Consider the power tool 300 of FIG. 2, which is merely one example of a battery clutch tool upon which an example embodiment may be implemented. In this regard, FIG. 2 illustrates a partial cutaway view of the power tool 300, where portions of the housing of the power tool 300 have been removed to show the relative locations of various internal components. As shown in FIG. 2, the power tool 300 may have a battery 310, which may be proximate to a battery management card 312 and/or a WiFi card 314. The battery 310 may be an example of the power unit 230 of FIG. 1, and the WiFi card 314 may be an example of the communication module 260 of FIG. 1. The power tool 300 may also include a measuring card 316, which may interface with various ones of the example sensors 250 discussed in reference to FIG. 1. A trigger 318 may be used to operate the power tool 300, and the trigger 318 may be a portion of the power control assembly 240. The power tool 300 may also include an encoder board 320 configured to interface with a brushless DC (BLDC) motor 322. The BLDC motor 322 may be an example of the motor 220 of FIG. 1. The drive assembly 210 of FIG. 1 may, in this example, include planetary gearing 330, a clutch 332, and bevel gearing 334 before the end effector 340 is ultimately rotated.

The power tool 300 may typically be configured to either be run at full speed, or be run at an alternate (selectable) speed. The mechanical clutch (i.e., clutch 332) may be configured to break or interrupt the drive train when a torque level applied to the output (i.e., the end effector 340) of the power tool 300 exceeds a threshold value. The threshold value may be a preset value or a value that is adjustable or selectable by the operator. An electric device such as, for example, a snap action switch, may be used to sense axial movement of the clutch cams and shut off the BLDC motor 322 when such axial movement is detected (thereby indicating that the clutch 332 has interrupted the drive train).

Figure 3A:
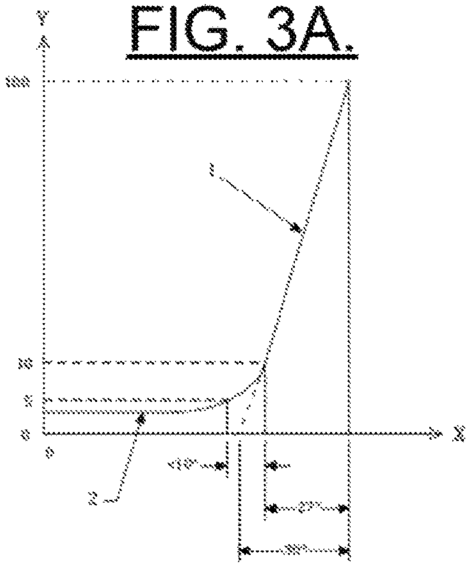
FIG. 3A illustrates a plot of angle vs. torque rate for a high torque-rate joint of an example embodiment.
Figure 3B:
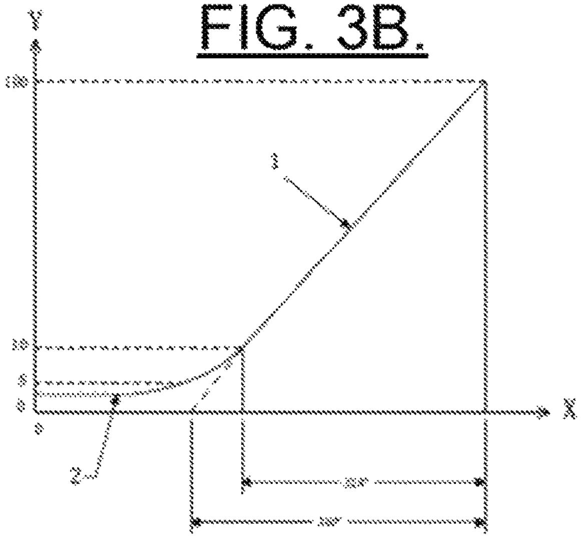
FIG. 3B illustrates a plot of angle vs. torque rate for a low torque-rate joint of an example embodiment.

When evaluating power tool performance, torque accuracy is typically evaluated at various clutch settings from 0% of the tool's torque range to 100% of the tool's torque range. These values are tested on both a high torque rate joint (as shown in FIG. 3A) and a low torque rate joint (as shown in FIG. 3B). Accordingly, as noted above, the accuracy of the final torque applied by the end effector 340 when the clutch 332 breaks or otherwise interrupts the drive train will depend, at least in part on motor speed. In this regard, for higher motor speeds, the dynamic drift inserted by the mechanical components of the system will be more impactful than they would otherwise be at lower speeds.

As load on the BLDC motor 322 increases, the current required to drive the BLDC motor 322 also increases. That is to say, motor torque, and hence tool output torque, increase with current draw on the BLDC motor 322. The relationship of motor torque and motor current can therefore be used as an advantage in electrically powered clutch tools. In this regard, for example, motor current can be monitored during the tightening cycle to provide an indication of torque. When a predetermined percentage of the target shut-off torque (i.e., the torque setting at which the clutch 332 breaks) is reached, a speed change may be initiated. For example, the speed of the BLDC motor 322 may be slowed (either in a step change, in a series of steps, or in a continuous and slow speed reduction) until the tightening cycle is completed. Accordingly, when the clutch 332 breaks or otherwise interrupts the drive train, the interruption will start from a slower speed, and will therefore result in less dynamic drift, and therefore a more accurate final torque. An additional advantage that may be achieved by this change is that the mean shift (i.e., the difference between the torque on a high torque-rate joint versus a low torque-rate joint) is reduced due to the lower speed.

Figure 4:
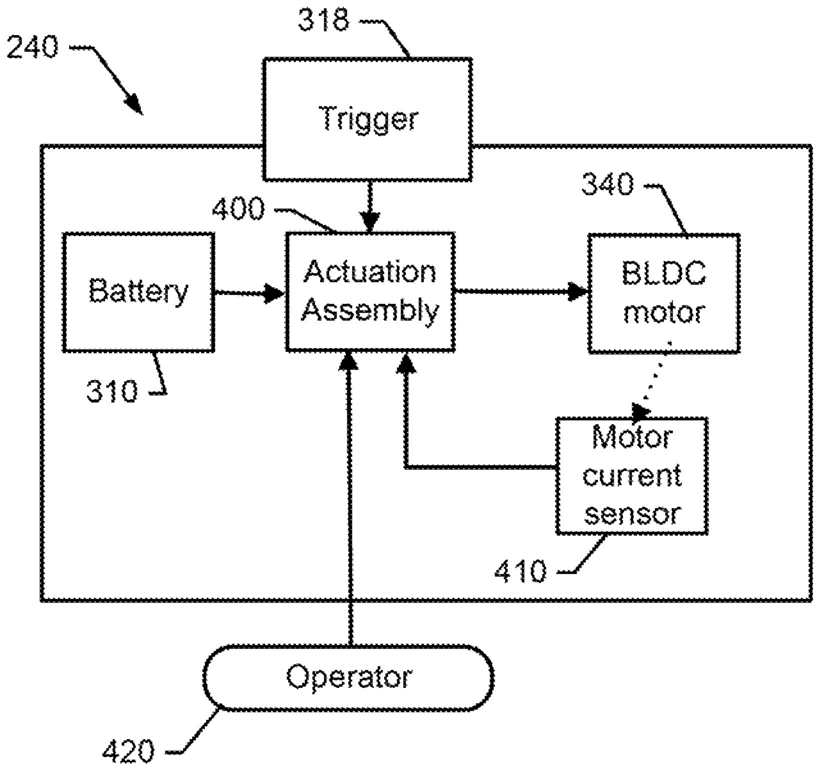
FIG. 4 illustrates a block diagram of one implementation of a power control assembly in accordance with an example embodiment.

FIG. 4 illustrates a block diagram of one implementation of the power control assembly 240 that may achieve the results discussed above. In this regard, the power control assembly 240 may include the trigger 318 (or other operator) that is operable by depressing the trigger 318 (or a portion thereof) to either pivot the trigger 318 about a pivot axis or otherwise urge a body of the trigger 318 into a housing portion (e.g., the handle) of the power tool 300. When the trigger 300 is depressed, a switch within an actuation assembly 400 may be operated to apply driving current to the BLDC motor 322 from the battery 310 to achieve a first drive speed. Meanwhile, a motor current sensor 410 may be an example of the sensors 250 of FIG. 1, and may monitor the current (and therefore the torque) supplied to the BLDC motor 322. The motor current sensor 410 may provide an indication of the motor current supplied to the BLDC motor 322 to the actuation assembly 400. When a predefined (or preset) current value is reached, the actuation assembly 400 may be configured to reduce the speed of the BLDC motor 340 (e.g., by targeting a second drive speed that is lower than the first drive speed). All of this may happen without any additional movement of the trigger 318. In other words, the change in speed of the motor 322 may be initiated automatically when the trigger 318 is in a depressed state and without any additional movement of the trigger 318.

In some embodiments, the actuation assembly 400 may be a circuit configured to alter a speed control input to the BLDC motor 340 responsive to the motor current supplied to the BLDC motor 322 reaching the predefined current value. However, in some cases, the actuation assembly 400 may be embodied as processing circuitry configured to alter the speed control input to the BLDC motor 340 responsive to the motor current supplied to the BLDC motor 322 reaching the predefined current value. The processing circuitry may include a field programmable gate array (FPGA), application specific integrated circuit (ASIC), a processor configured with software stored in non-transitory storage media, and/or the like.

Figure 5:
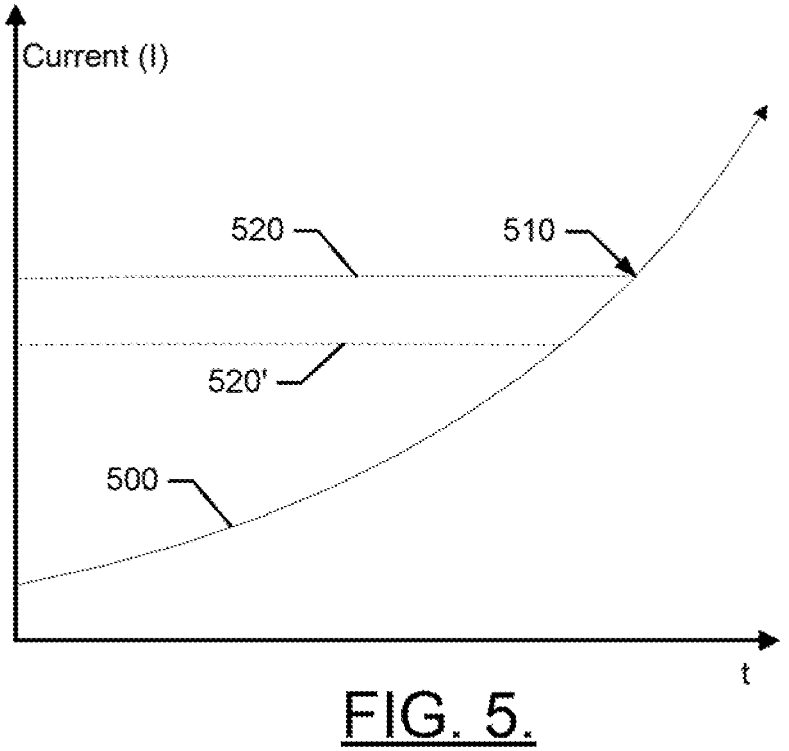
FIG. 5 illustrates one potential graph of motor current vs. time for operation of a power control assembly and an actuation assembly in accordance with an example embodiment.
Figure 6:
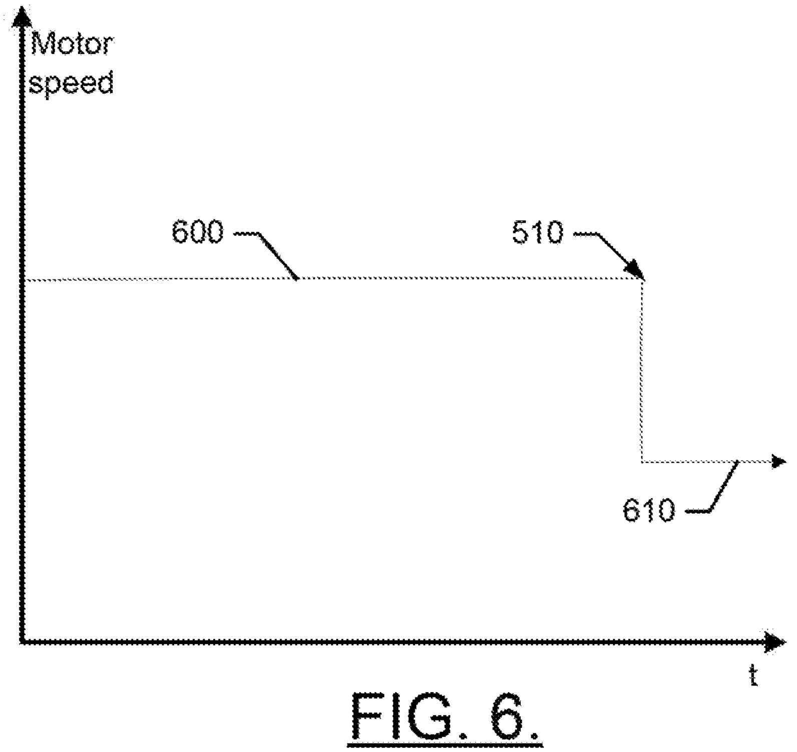
FIG. 6 illustrates a change in target drive speed responsive to operation of the actuation assembly in accordance with an example embodiment.

FIG. 5 illustrates one potential graph of motor current vs. time for operation of the power control assembly 240, and the actuation assembly 400, as described above. Meanwhile, FIG. 6 illustrates a change in target drive speed responsive to operation of the actuation assembly 400. In this regard, curve 500 represents the curve of motor current over time as the torque also increases due to increasing load during a tightening cycle while first drive speed 600 is targeted by the actuation assembly 400. Point 510 represents the moment at which the motor current reaches the predefined current value 520. When an example embodiment is employed, and the actuation assembly 400 operates responsive to the predefined current value 520 being reached, motor speed may be decreased to the second drive speed 610 shown in FIG. 6. The shut-off torque (e.g., the torque at which the clutch 332 interrupts the drive train) may then be reached at a lower speed (i.e., the second drive speed 610), and therefore a more accurate torque will be achieved due to the decreased dynamic effects of the mechanical components of the power tool 300 at the lower speed.

As shown in FIG. 4, an operator 420 may be enabled to interact with the actuation assembly 400 to reduce the predefined current value 520' as shown in FIG. 5. An increase could also be inserted, if desired. It can be appreciated that by lowering the predefined current value 520', the tightening cycle may be slightly lengthened since a slower speed is implemented earlier in the tightening cycle. Meanwhile, by using the higher predefined current value 520, the tightening cycle can be slightly shortened since a higher speed is used until later in the tightening cycle. Thus, the operator 420 can provide some level of control over the overall cycle time of a tightening cycle by adjustment of the predefined current value 520 and therefore also the percentage of target shut-off torque at which the speed reduction occurs.

Accordingly, example embodiments may provide an automated speed shifting (i.e., reduction) function that occurs during a tightening (or fastening) cycle, and is triggered based on motor current. Example embodiments may therefore provide increased tool accuracy, a decrease in the mean shift between low and high torque-rate applications, and an increase in cycle times by having a tool with a high free speed. Example embodiments may be employed on applications that are sensitive to shock loads as well (e.g. electronic assembly). Of note, although FIG. 2 shows a right angle tool, example embodiments can also be employed on inline or pistol grip tool configurations as well.

Accordingly, a power tool of an example embodiment may include an end effector configured to enable a fastener to be applied by the power tool via a fastening cycle, a power unit, a drive assembly configured to apply drive power to the end effector responsive to application of input power thereto, and a motor configured to supply the input power to the drive assembly selectively based on operation of a power control assembly that controls coupling of the motor to the power unit. The drive assembly includes a clutch configured to interrupt application of the drive power at a target torque. The power control assembly may be configured to adaptively change speed of the motor in response to the power tool reaching a predefined torque value that is less than the target torque during the fastening cycle.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, power tool further includes a sensor that measures an indication of torque at the end effector. In some cases, the sensor may be a motor current sensor. In an example embodiment, the power control assembly may be configured to direct the motor to operate at a first target speed prior to reaching the predefined torque value, and operate at a second target speed that is lower than the first target speed after reaching the predefined torque value. In some cases, a reduction from the first target speed to the second target speed may be a prompt reduction, a stepped reduction, or a continuously decaying reduction from the first target speed to the second target speed. In an example embodiment, the power control assembly may be configured to enable an operator to adjust a set point of the predefined torque value. In some cases, the operator may be enabled to the motor may be a brushless DC motor, the power unit may be a battery, and the clutch may interrupt application of power from the battery to the brushless DC motor when the target torque is reached. In an example embodiment, the power tool may include a right angle tool configuration, an inline tool configuration, or a pistol grip tool configuration. In some cases, the power control assembly may include a trigger, and the change in speed of the motor may be initiated automatically when the trigger is in a depressed state and without any additional movement of the trigger.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A power tool comprising:

an end effector configured to enable a fastener to be a applied to a workpiece by the power tool via a fastening cycle, the fastening cycle being a duration of time from a starting of rotation of the fastener to completing application of the fastener to the workpiece with a target torque;

a power unit;

a drive assembly configured to apply drive power to the end effector responsive to application of input power thereto; and a motor configured to supply the input power to the drive assembly selectively based on operation of a power control assembly that controls coupling of the motor to the power unit, wherein the drive assembly comprises a clutch configured to interrupt application of the drive power at the target torque, wherein the power control assembly is configured to adaptively change speed of the motor in response to the power tool reaching a predefined torque value that is less than the target torque during the fastening cycle;

wherein the power control assembly is configured to enable an operator to alter a length of the fastening cycle by adjusting a set point of the predefined torque value.

2. The power tool of claim 1, further comprising a sensor, the sensor measuring an indication of torque at the end effector.

3. The power tool of claim 2, wherein the sensor comprises a motor current sensor.

4. The power tool of claim 1, wherein the power control assembly is configured to direct the motor to operate at a first target speed prior to reaching the predefined torque value, and operate at a second target speed that is lower than the first target speed after reaching the predefined torque value.

5. The power tool of claim 4, wherein a reduction from the first target speed to the second target speed is a prompt reduction from the first target speed to the second target speed.

6. The power tool of claim 4, wherein a reduction from the first target speed to the second target speed includes a series of step reductions from the first target speed to the second target speed.

7. The power tool of claim 4, wherein a reduction from the first target speed to the second target speed is continuous reduction over time from the first target speed to the second target speed.

8. The power tool of claim 1, wherein the motor is a brushless DC motor, wherein the power unit is a battery, and wherein the clutch interrupts application of power from the battery to the brushless DC motor when the target torque is reached.

9. The power tool of claim 8, wherein the power tool comprises a right angle tool configuration, an inline tool configuration, or a pistol grip tool configuration.

10. The power tool of claim 1, wherein the power control assembly comprises a trigger, and wherein the change in speed of the motor is initiated automatically when the trigger is in a depressed state and without any additional movement of the trigger.

11. A power control assembly for a power tool, the power control assembly comprising:

an actuation assembly; and a tool actuator configured to provide a speed control input to a motor adapted to provide drive power to an end effector of the power tool when the tool actuator is actuated, the end effector being configured to enable a fastener to be applied to a workpiece by the power tool via a fastening cycle, the fastening cycle being a duration of time from a starting of rotation of the fastener to completing application of the fastener to the workpiece with target torque, wherein the actuation assembly is configured to adaptively change speed of the motor in response to the power tool reaching a predefined torque value that is less than the target torque during the fastening cycle;

wherein the actuation assembly is configured to enable an operator to alter a length of the fastening cycle by adjusting a set point of the predefined torque value.

12. The power control assembly of claim 11, wherein an indication of torque is measured based on sensing motor current.

13. The power control assembly of claim 11, wherein the power control assembly is configured to direct the motor to operate at a first target speed prior to reaching the predefined torque value, and operate at a second target speed that is lower than the first target speed after reaching the predefined torque value.

14. The power control assembly of claim 13, wherein a reduction from the first target speed to the second target speed is a prompt reduction or a series of step reductions from the first target speed to the second target speed.

15. The power control assembly of claim 11, wherein the motor is a brushless DC motor powered by a battery, and wherein the power tool includes a clutch configured to interrupt application of power from the battery to the brushless DC motor when the target torque is reached.

16. The power control assembly of claim 11, wherein the tool actuator comprises a trigger, and wherein the change in speed of the motor is initiated automatically when the trigger is in a depressed state and without any additional movement of the trigger.

* * * * *